(12) United States Patent
Wong et al.

(10) Patent No.: US 7,835,874 B2
(45) Date of Patent: Nov. 16, 2010

(54) SYSTEM AND METHOD FOR GAS FLOW VERIFICATION

(75) Inventors: Vernon Wong, Mountain View, CA (US); Richard J. Meinecke, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 195 days.

(21) Appl. No.: 12/104,438

(22) Filed: Apr. 17, 2008

(65) Prior Publication Data

US 2008/0195332 A1  Aug. 14, 2008

Related U.S. Application Data

(62) Division of application No. 11/083,761, filed on Mar. 16, 2005, now Pat. No. 7,376,520.

(51) Int. Cl.
*G01F 17/00* (2006.01)
(52) U.S. Cl. ...................................... 702/50
(58) Field of Classification Search .................. 702/45, 702/50
See application file for complete search history.

(56) References Cited

U.S. PATENT DOCUMENTS 6,277,199 B1 * 8/2001 Lei et al. ..................... 118/696
6,439,253 B1 * 8/2002 Easton .......................... 137/9
7,335,277 B2 * 2/2008 Makino et al. .......... 156/345.32

* cited by examiner

*Primary Examiner*—Aditya Bhat
(74) *Attorney, Agent, or Firm*—Martine Penilla & Gencarella, LLP

(57) ABSTRACT

A gas flow rate verification apparatus is provided for shared use in a multiple tool semiconductor processing platform. The gas flow rate verification apparatus is defined to measure a pressure rate of rise and temperature within a test volume for determination of a corresponding gas flow rate. The apparatus includes first and second volumes, wherein the second volume is larger than the first volume. The apparatus also includes first and second pressure measurement devices, wherein the second pressure measurement device is capable of measuring higher pressures. Based on the target gas flow rate to be measured, either the first or second volume can be selected as the test volume, and either the first or second pressure measurement device can be selected to measure the pressure in the test volume. Configurability of the apparatus enables accurate measurement of gas flow rates over a broad range and in an time efficient manner.

7 Claims, 6 Drawing Sheets

SYSTEM AND METHOD FOR GAS FLOW VERIFICATION

CLAIM OF PRIORITY

This application is a divisional application of U.S. patent application Ser. No. 11/083,761, filed on Mar. 16, 2005 now U.S. Pat. No. 7,376,520, the disclosure of which is incorporated in its entirety herein by reference.

BACKGROUND OF THE INVENTION

A number of modern semiconductor wafer fabrication processes require a process gas to be supplied in a carefully controlled manner to a reaction chamber, wherein the process gas is used to support or effect processing of the semiconductor wafer. For example, in a plasma etch process, a process gas is supplied to an etching chamber, wherein the process gas is converted to a plasma for etching materials present on the surface of the wafer. In most cases, the semiconductor wafer fabrication processes require the process gas supply to be carefully controlled. More specifically, a flow rate of the process gas to the reaction chamber needs to be maintained within a range defined by a recipe of the fabrication process. The process gas flow rate is commonly controlled by a mass flow controller (MFC) upstream from the reaction chamber. Thus, the accuracy at which the process gas flow rate can be controlled is generally dictated by the accuracy of the MFC through which the process gas is required to pass.

It should be appreciated that the MFC device is a complex and sensitive instrument having a real-world gas flow rate control accuracy that is dependent upon many factors. During manufacture of the MFC device, the gas flow rate control provided by the MFC is verified to be within established MFC design specification tolerances. The MFC verification during manufacture is typically performed in a controlled laboratory environment using $N_2$ gas. Thus, the MFC verification during manufacture may not bound the environmental conditions to which the MFC will be exposed during a real-world implementation. Additionally, conversion factors are used to translate the MFC verification results using $N_2$ into corresponding verification results representing a real gas. It should be appreciated that these conversion factors have an inherent level of uncertainty. Furthermore, after the MFC device is shipped to the end-user and installed in the end-user's system, a potential exists for the MFC device to be out of tolerance with respect to its design specification. Also, the gas flow rate control capability of the MFC device needs to be periodically verified to ensure that an out of tolerance condition has not be introduced in the form of calibration drift, zero drift, or gas-calibration error that may occur during startup or service of the MFC device.

In view of the foregoing, it is desirable to verify the gas flow rate control capability of the MFC device in the real-world implementation using real gases. However, the end-user's equipment for verifying the gas flow rate control accuracy of the MFC device is typically not capable of matching the tight tolerance levels of the MFC design specification. Therefore, a need exists for improvements in technology related to accurate verification of the gas flow rate control capability of the MFC device under anticipated operating conditions.

SUMMARY OF THE INVENTION

It should be appreciated that the present invention can be implemented in numerous ways, such as a process, an apparatus, a system, a device or a method. Several inventive embodiments of the present invention are described below.

In one embodiment, a gas flow rate verification apparatus is disclosed. The apparatus includes a first volume defined within a first chamber and a second volume defined within a second chamber. The second volume is larger than the first volume. The apparatus further includes a first pressure measurement device and a second pressure measurement device. Each of the first and second pressure measurement devices is configured to be connected in fluid communication with either the first volume, the second volume, or both the first and second volumes. The second pressure measurement device is capable of measuring higher pressures than the first pressure measurement device. The apparatus is further defined such that each of the first volume, the second volume, or both the first and second volumes is selectable as a test volume for measuring a gas flow rate. Additionally, each of the first pressure measurement device or the second pressure measurement device is selectable for measuring a pressure within the test volume.

In another embodiment, a central cluster tool platform for semiconductor processing is disclosed. The tool platform includes a plurality of wafer processing modules accessible from a central location. The tool platform also includes a plurality of gas supply control systems, wherein each of the plurality of gas supply control systems is associated with a respective one of the wafer processing modules. The tool platform further includes a gas flow rate verification device disposed in a central location relative to the plurality of wafer processing modules. The gas flow rate verification device is defined to be selectively connected in fluid communication with each of the plurality of gas supply control systems. The gas flow rate verification device is defined to measure a gas flow rate supplied by the gas supply control system to which the gas flow rate verification device is selectively connected.

In another embodiment, a method for operating a gas flow rate verification device is disclosed. The method includes identifying a target gas flow rate range. A test volume within the gas flow rate verification device is then selected based on the identified target gas flow rate rage. The selected test volume is either a small volume or a large volume. A pressure measurement device within the gas flow rate verification device is also selected based on the identified target gas flow rate range. The selected pressure measurement device is either a lower pressure measurement device or a higher pressure measurement device. The selected test volume is then evacuated. The method then proceeds with exposing the test volume to a gas flow rate to be measured. A pressure rate of rise within the test volume is then measured. Additionally, a temperature within the test volume is measured. Using the measured pressure rate of rise and temperature within the test volume, the gas flow rate into the test volume is determined.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
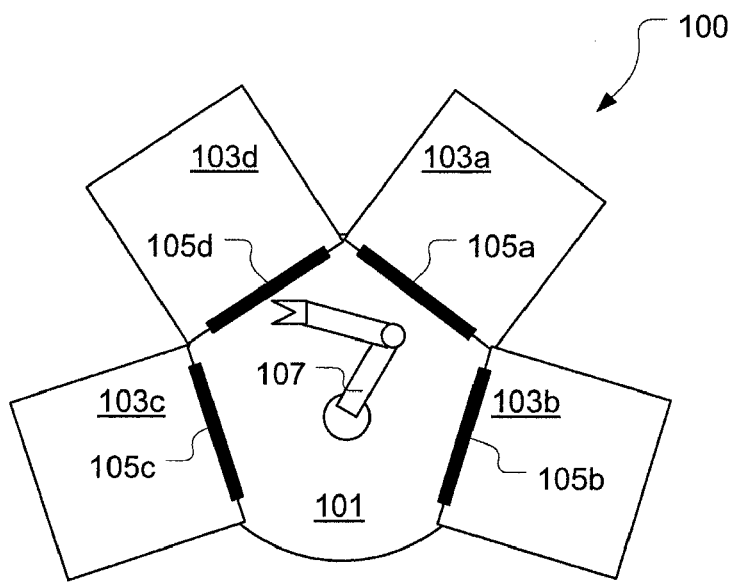
FIG. 1A is an illustration showing a top view of a central cluster tool platform including multiple process modules, in accordance with one embodiment of the present invention.

FIG. 1A is an illustration showing a top view of a central cluster tool platform ("tool platform") 100 including multiple process modules 103a-103d, in accordance with one embodiment of the present invention. The tool platform 100 includes a central area 101 from which an access 105a-105d of each process module 103a-103d is accessible. A wafer transfer mechanism 107 is disposed within the central area 101, such that a wafer can be transferred to or from each process module 103a-103d. In one embodiment, the transfer mechanism 107 is defined as a robotic manipulation device. Though the exemplary tool platform 100 of FIG. 1A shows four process modules 103a-103d, it should be appreciated that other embodiments of the tool platform 100 can include more or less process modules. Furthermore, it should be appreciated that each process module 103a-103d can be defined to perform one or more wafer processing operations, as known to those skilled in the art.

Figure 1B:
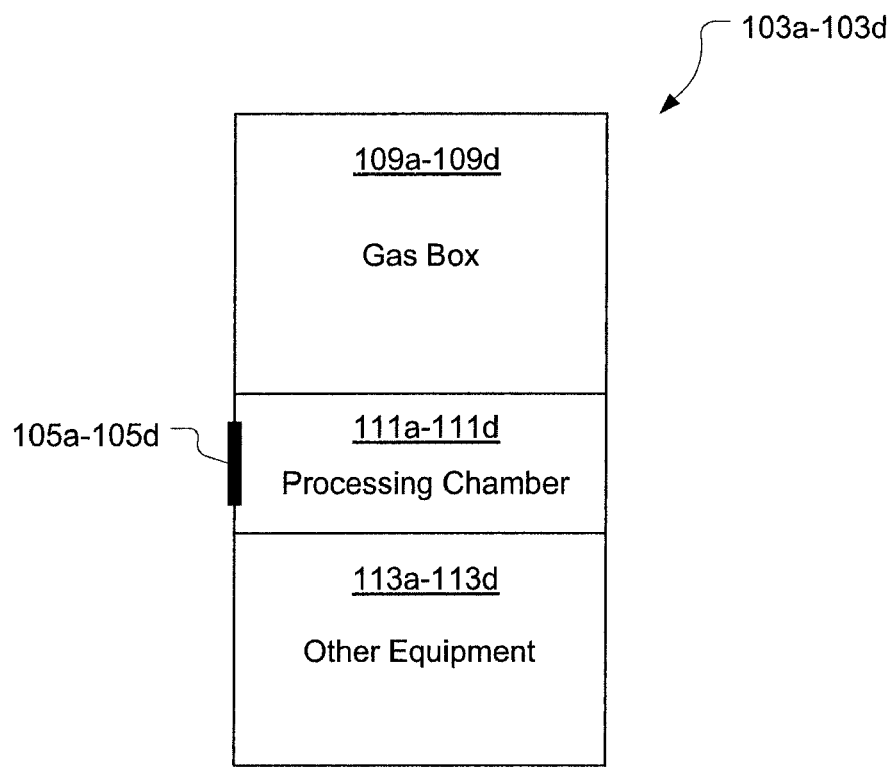
FIG. 1B is an illustration showing a side view of the process modules, in accordance with one embodiment of the present invention.

FIG. 1B is an illustration showing a side view of the process modules 103a-103d, in accordance with one embodiment of the present invention. Each process module 103a-103d is defined to include a processing chamber 111a-111d. The access 105a-105d of each processing chamber 111a-111d provides for transfer of the wafer into and out of the processing chamber 111a-111d, while enabling the process chamber 111a-111d to be sealed during operation. In one embodiment, the access 105a-105d is defined as a slit-valve. Each process module 103a-103d is further equipped with a gas box 109a-109d disposed above the processing chamber 111a-111d. The gas box 109a-109d is defined to supply a required process gas to the process chamber 111a-111d at an appropriate gas flow rate. Each process module 103a-103d further includes a region 113a-113d for other equipment below the process chamber 111a-111d. The other equipment includes various types of equipment necessary for operation of the processing chamber 111a-111d, such as power supplies, electrical equipment, control equipment, etc. It should be appreciated that each process module 103a-103d represents a very complex system including numerous interrelated components. In order to avoid unnecessarily obscuring the present invention, details of the processing chamber 111a-111d and other equipment 113a-113d are not further described herein.

Figure 2:
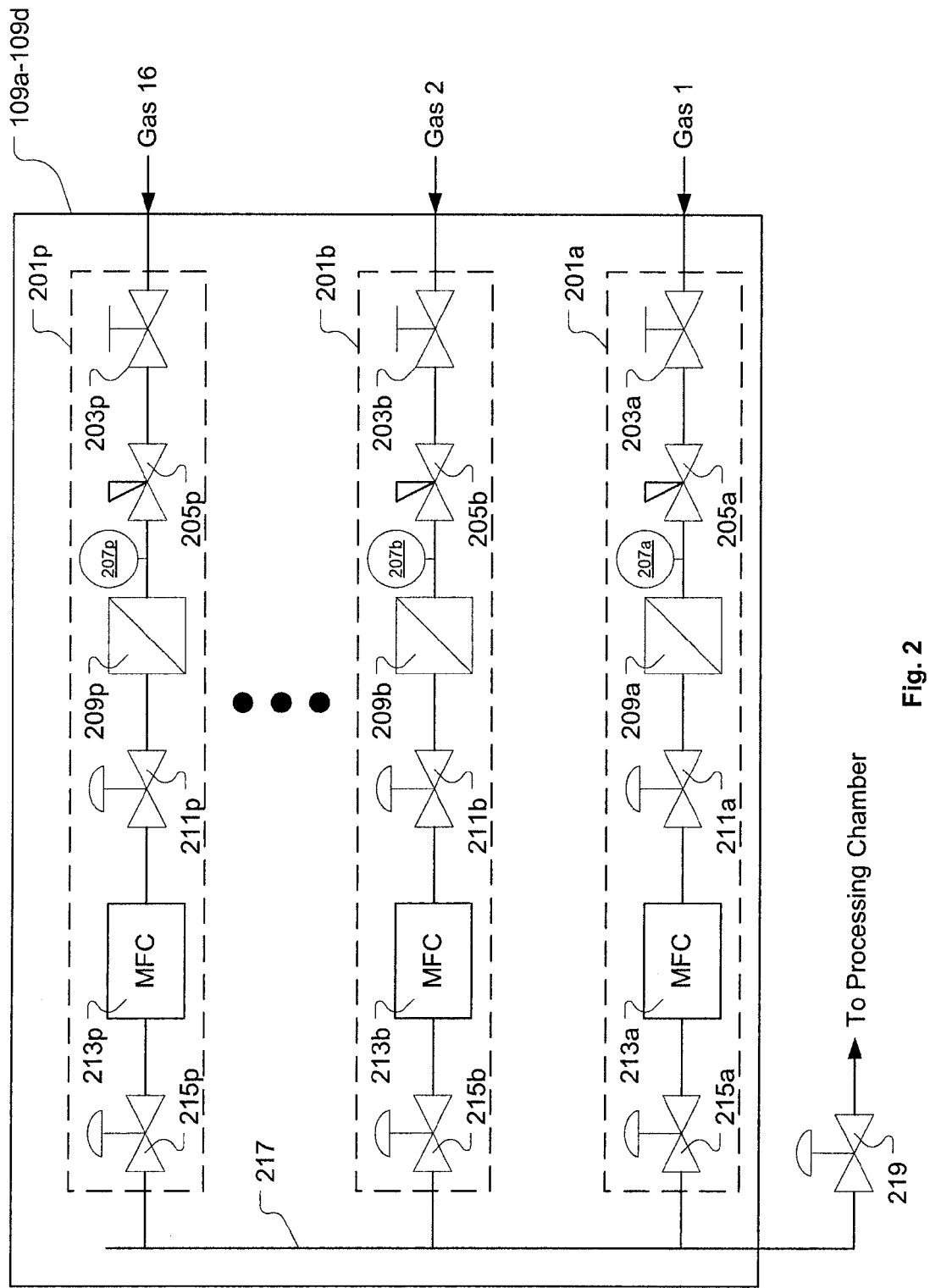
FIG. 2 is an illustration showing a simplified schematic of the gas box, in accordance with one embodiment of the present invention.

FIG. 2 is an illustration showing a simplified schematic of the gas box 109a-109d, in accordance with one embodiment of the present invention. As previously mentioned, the gas box 109a-109d is used to command an appropriate gas mixture in the process chamber 111a-111d at an appropriate gas flow rate. The gas box 109a-109d includes a number of gas sticks 201a-210p. In the embodiment of FIG. 2, the gas box 109a-109d includes sixteen gas sticks 201a-201p. However, it should be appreciated that a different number of gas sticks can be used in different embodiments. Each gas stick 201a-201p can be used to provide a particular gas or gas mixture to the processing chamber 111a-111d at a controlled flow rate. For example, FIG. 2 shows an input to each gas stick 201a-201p being connected to receive Gas 1 through Gas 16, respectively. The outputs of each gas stick 201a-201p are connected to a common manifold 217. The manifold 217 is plumbed to the processing chamber 111a-111d through an isolation valve 219.

Each gas stick 201a-201p includes a manual valve 203a-203p, a gas regulator 205a-205p, a pressure measurement device 207a-207p, a filter 209a-209p, control valves 211a-211p and 215a-215p, and a mass flow controller (MFC) 213a-213b. It should be appreciated that in various embodiments each gas stick 201a-201b can be defined without some of the above-mentioned components or with additional components. During operation the various gas sticks 201a-201p are controlled to provide a specifically formulated gas supply to the processing chamber 111a-111d at a specific flow rate. An accuracy of the gas flow rate exiting each gas stick 201a-201p and subsequently entering the processing chamber 111a-111b is dictated by the accuracy of the MFCs 213a-213p. Therefore, it is important that each MFC 213a-213p be capable of controlling its respective gas flow rate within an allowable tolerance range. In order to ensure that the gas flow rate into the processing chamber 111a-111d is acceptable, it is necessary to verify the calibration of each MFC 213a-213p.

In one embodiment, calibration of each MFC 213a-213b can be performed using a pressure rate of rise method ("RoR method" hereafter). In the RoR method, a gas flow rate is determined by measuring a rate of pressure rise and temperature within a chamber of known volume, as the gas is directed into the chamber. Using Equation 1 below, the measured gas flow rate is determined.

Equation 1:

$$\text{Flow Rate(sccm)} = \frac{(\text{Volume(cm}^3))\left(\text{Pressure } RoR\left(\frac{mT}{\sec}\right)\right) C\left(\frac{(\sec)(K)}{(mT)(\min)}\right)}{273.16 + \text{Temp. (C.)}},$$

wherein C represents a constant conversion factor and RoR means rate of rise.

The measured gas flow rate is compared to a gas flow setpoint of the MFC to verify that the MFC is operating within its flow tolerance. In general, the MFC 213a-213p for each gas stick 201a-201p is calibrated separately. Additionally, it is preferable to perform at least a ten point gas calibration for each MFC 213a-213p. The ten point gas calibration includes verification of ten gas flow setpoints equally spaced over the operating range of the MFC 213a-213p, beginning with the minimum gas flow rate and ending with the maximum gas flow rate. In the embodiment of FIG. 2, ten gas flow calibration points for each of the sixteen gas sticks 201a-201p requires performance of 160 gas calibration measurements. Thus, it is important that each gas calibration measurement be performed in a reasonably short period of time.

Conventionally, the process chamber 111a-111d has been used to perform the gas flow rate measurements for calibrating the MFCs 213a-213p. It is necessary to evacuate the process chamber 111a-111d prior to starting the gas flow rate measurement in the process chamber 111a-111d. Consequently, because of the large volume of the process chamber 111a-111d, it can take a long time to evacuate the process chamber 111a-111d and observe a sufficient gas pressure increase within the process chamber 111a-111d to measure the gas flow rate. For example, it can take up to five minutes to perform a single gas flow rate measurement using the process chamber 111a-111d. Thus, performing a full gas calibration, e.g., a ten point calibration of each gas stick 201a-201p, can take a substantial amount of time, during which the process chamber 111a-111d cannot be used for wafer fabrication processes. Thus, use of the process chamber 111a-111d to perform gas flow rate calibration measurements can adversely affect system availability.

In addition to the foregoing, the large volume of the process chamber 111a-111d and the numerous structures present therein cause the process chamber 111a-111d to have a large and non-uniform thermal mass. The thermal mass characteristics of the processing chamber 111a-111d introduce problems with respect to obtaining and maintaining a uniform temperature distribution within the processing chamber 111a-111d during gas flow rate calibration measurements. Additionally, temperature feedback mechanisms commonly associated with the processing chamber 111a-111d are usually not effective enough to control the temperature within the processing chamber 111a-111d.

To avoid the non-uniform temperature distribution problems associated with the processing chamber 111a-111d, the gas flow rate measurements can be performed with the chamber at room temperature. However, it can take a substantial amount of time, e.g., one-half day or longer, for the processing chamber 111a-111d to cool down from normal operating temperatures to room temperature. Therefore, having to allow the process chamber 111a-111d to reach thermal equilibrium at room temperature can adversely affect wafer fabrication throughput.

In summary, using the process chamber 111a-111d to perform gas flow rate calibration measurements is not considered ideal because the large volume of the process chamber 111a-111d introduces difficulty in controlling temperatures. Additionally, using the process chamber 111a-111d to perform a multiple point gas flow rate calibration takes too long and requires too much process chamber 111a-111d downtime. Additionally, characteristics of the process chamber 111a-111d, such as volume determination and temperature control, do not allow for gas flow rate measurements that are sufficiently accurate to verify the required MFC 213a-213p performance specifications.

Figure 3:
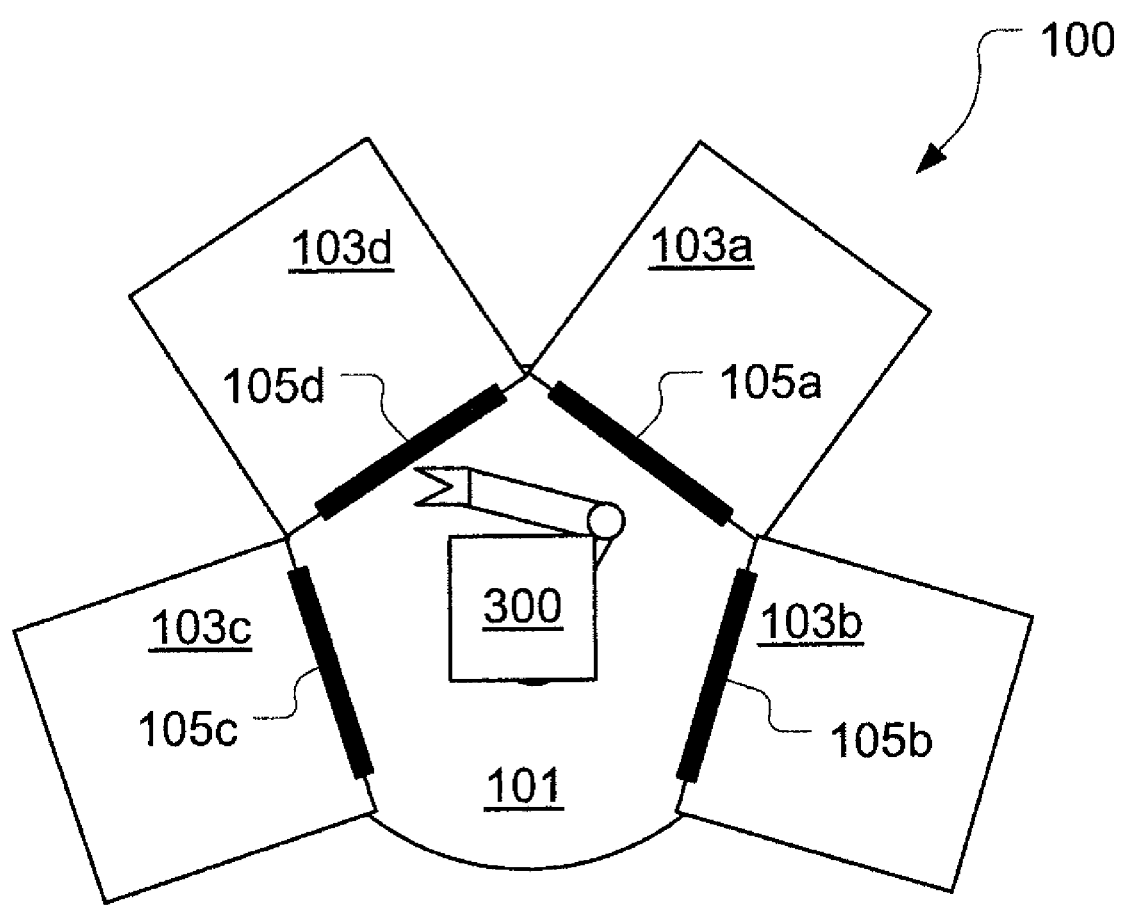
FIG. 3 is an illustration showing the tool platform of FIG. 1A having a dedicated pressure rate of rise gas flow rate measurement apparatus implemented therein, in accordance with one embodiment of the present invention.

To resolve the problems mentioned above, the present invention provides a gas flow rate verification apparatus capable of servicing multiple gas boxes 109a-109d within the tool platform 100. FIG. 3 is an illustration showing the tool platform 100 of FIG. 1A having a dedicated gas flow rate verification apparatus 300 implemented therein, in accordance with one embodiment of the present invention. For ease of discussion, the gas flow rate verification apparatus 300 of the present invention is referred to as the flow verifier device 300 in the remainder of this description. It should be appreciated that the flow verifier device 300 is implemented in the tool platform 100 to provide accurate and repeatable gas flow rate measurements for verifying calibration of the MFCs 213a-213p in each gas box 109a-109d of each process module 103a-103d. As will be discussed in detail below, the flow verifier device 300 includes accurately known chamber volumes, pressure sensing devices, and temperature sensing devices that are separate from the process chambers 111a-111d of each process module 103a-103d.

The flow verifier device 300 is centrally located in the tool system 100. Each gas box 109a-109d is connected to the flow verifier device 300 by a single line extending from the output manifold 217 of each gas box 109a-109d to the flow verifier device 300. The flow verifier device 300 can be utilized by any process module 103a-103d installed on the tool system 100. However, only one process module 103a-103d should use the flow verifier device 300 at any given time to perform gas flow rate measurements.

Figure 4:
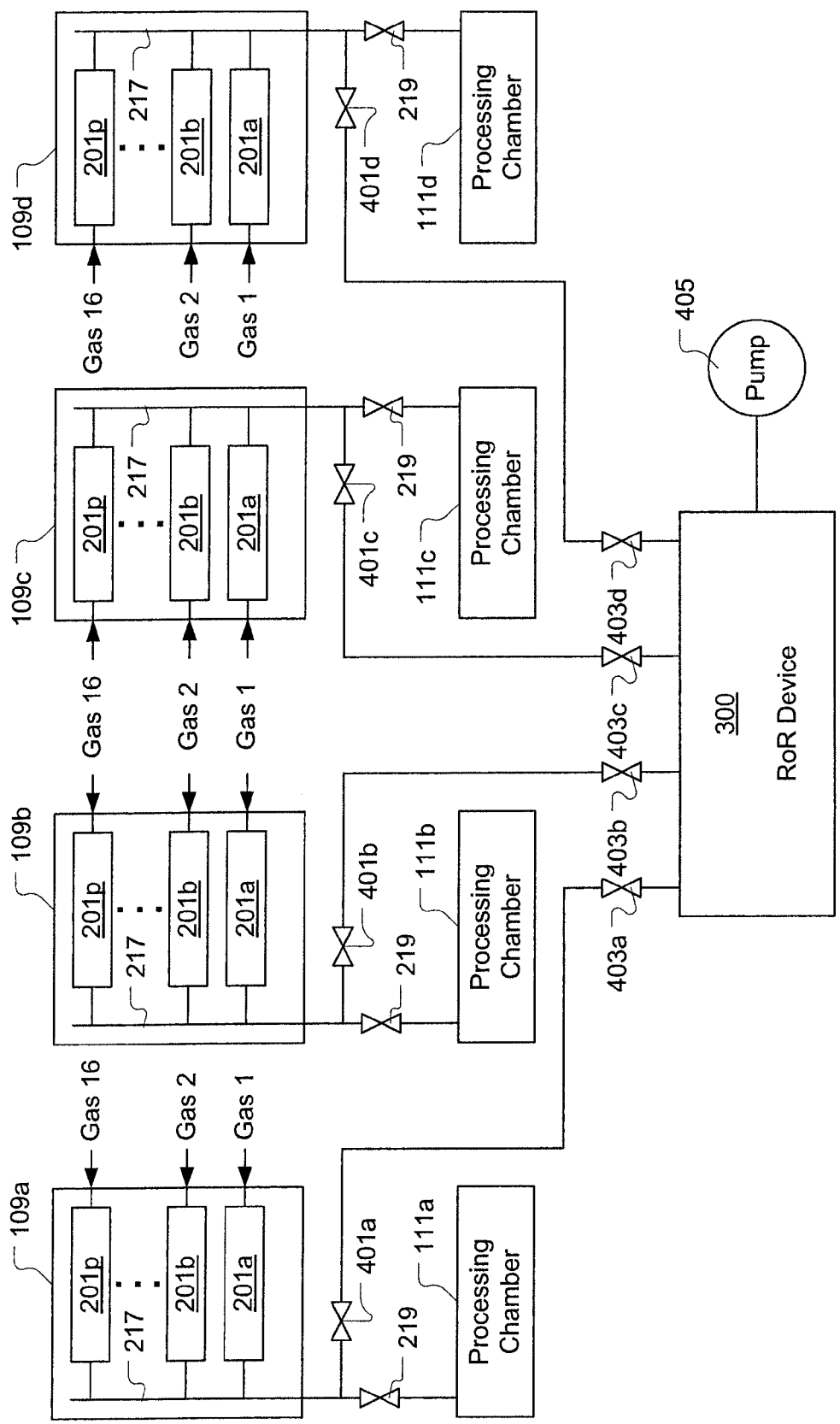
FIG. 4 is an illustration showing a schematic of the flow verifier device implementation in the tool platform, in accordance with one embodiment of the present invention.

FIG. 4 is an illustration showing a schematic of the flow verifier device 300 implementation in the tool platform 100, in accordance with one embodiment of the present invention. As previously discussed with respect to FIGS. 1B and 2, the tool platform 100 includes the gas boxes 109a-109d, wherein each gas box 109a-109d includes a respective set of gas sticks 201a-201p. Each gas stick 201a-201p functions to receive an input gas/gas mixture and provide the gas/gas mixture to the output manifold 217 at a controlled flow rate corresponding to a setting of the MFC 213a-213p of the gas stick 201a-201p. As previously mentioned with respect to FIG. 2, the output manifold 217 of each gas box 109a-109d is plumbed to the processing chamber 111a-111d within the common process module 103a-103d. Fluid communication between the output manifold 217 and the processing chamber 111a-111d can be controlled by isolation valves 219.

The centralized flow verifier device 300 is plumbed to the output manifold 217 of each gas box 109a-109d. In one embodiment, a single line is used to establish fluid communication between each output manifold 217 and the flow verifier device 300. An isolation valve 401a-401d is provided near each output manifold 217 within the respective line extending between the output manifold 217 and the flow verifier device 300. The isolation valves 401a-401d serve to isolate the output manifolds 217 during operation of the processing chambers 111a-111d. Additionally, the position of the isolation valves 401a-401d near the output manifolds 217 serves to limit the plumbing volume between the output manifolds 217 and the processing chambers 111a-111d during operation of the processing chambers 111a-111d. In one embodiment, each line entering the flow verifier device 300 from the gas boxes 109a-109d also includes an isolation valve 403a-403d positioned near the entry of the flow verifier device 300. The position of the isolation valves 403a-403d near the flow verifier device 300 serves to limit the plumbing volume between the flow verifier device 300 and the gas boxes 109a-109d that do not currently have access to the flow verifier device 300. Additionally, the flow verifier device 300 is connected in fluid communication with a pump 405, which provides a vacuum source for evacuating and purging the flow verifier device 300.

With reference to Equation 1 above, the volume used to determine the gas flow rate being provided by a particular MFC 213a-213d includes all fluidly connected plumbing volumes from the output of the particular MFC 213a-213p through the flow verifier device 300. Therefore, it is important that the plumbing between each gas box 109a-109d and the flow verifier device 300, as well as within each gas box 109a-109d and the flow verifier device 300, be well-defined and understood. The centralized placement of the flow verifier device 300 within the tool platform 100, with known tubing volumes between each gas box 109a-109d and the flow verifier device 300, allows for an accurate volume determination when using the flow verifier device 300 to perform gas flow rate measurements. Furthermore, the plumbing between each gas box 109a-109d and the flow verifier device 300, as well as within the flow verifier device 300, is configured to accommodate anticipated gas flow rates to be measured and the desired gas flow rate measurement timing characteristics.

Figure 5:
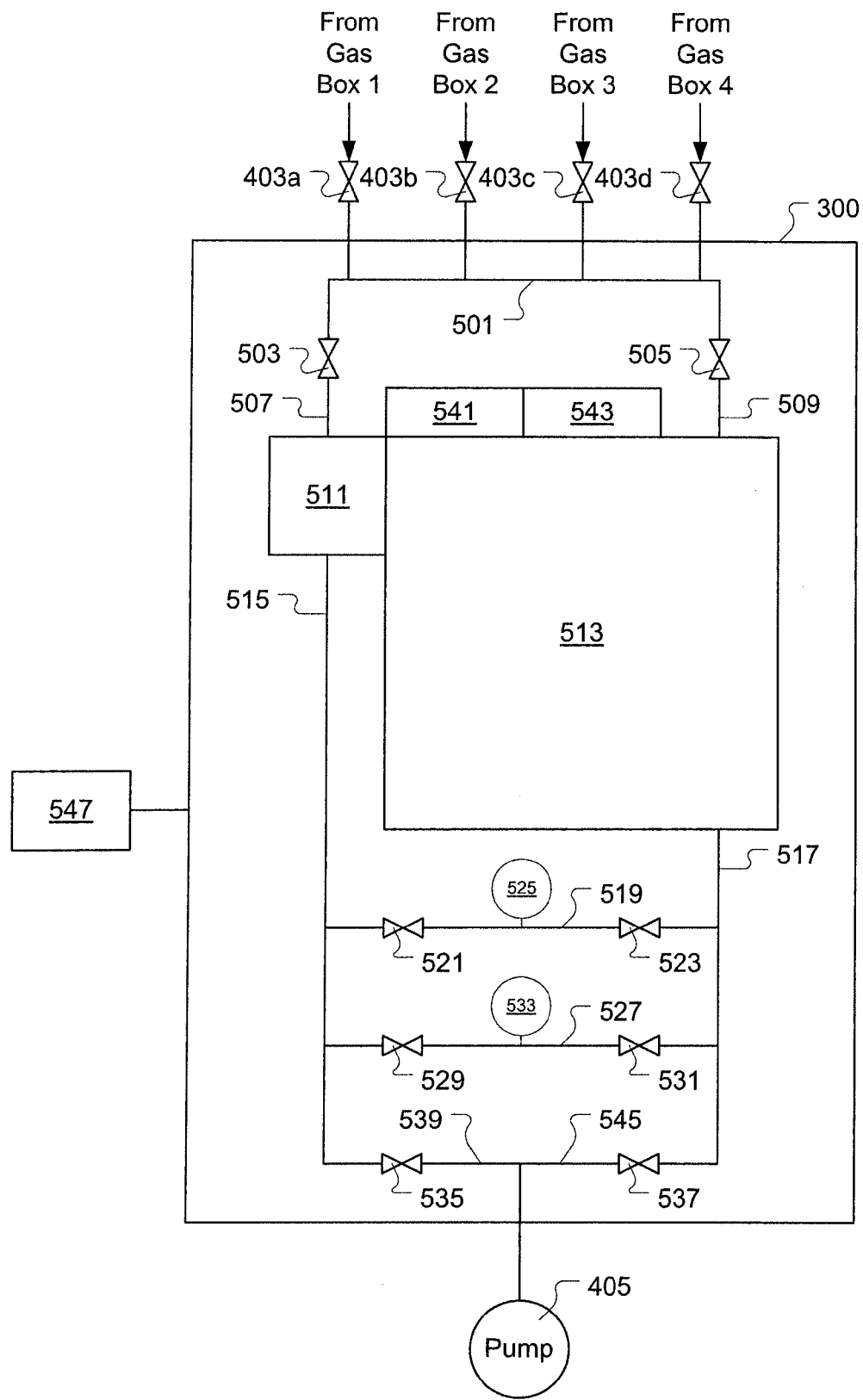
FIG. 5 is an illustration showing a schematic of the flow verifier device, in accordance with one embodiment of the present invention.

FIG. 5 is an illustration showing a schematic of the flow verifier device 300, in accordance with one embodiment of the present invention. The flow verifier device 300 includes an input manifold 501 to which an output of each isolation valve 403a-403d is connected. The input manifold 501 is connected to a first chamber 511 through an isolation valve 503 and an input line 507. The input manifold 501 is also connected to a second chamber 513 through an isolation valve 505 and an input line 509. The first chamber 511 is connected to an output line 515. The second chamber 513 is connected to an output line 517. The output line 515 of the first chamber 511 is connected to a discharge valve 535, which is in turn connected to a discharge line 539. Similarly, the output line 517 of the second chamber 513 is connected to a discharge valve 537, which is in turn connected to a discharge line 545. Both discharge lines 539 and 545 are connected to the pump 405, as previously discussed with respect to FIG. 4.

The flow verifier device 300 further includes a first bridge line 519 connected between the output line 515 of the first chamber 511 and the output line 517 of the second chamber 513. The first bridge line 519 is separated from the output lines 515 and 517 by valves 521 and 523, respectively. A first pressure measurement device 525 is connected to the first bridge line 519.

In a manner similar to the first bridge line 519, the flow verifier device 300 includes a second bridge line 527 connected between the output line 515 of the first chamber 511 and the output line 517 of the second chamber 513. The second bridge line 527 is separated from the output lines 515 and 517 by valves 529 and 531, respectively. A second pressure measurement device 533 is connected to the second bridge line 527.

The flow verifier device 300 is further defined to include a heater 541 for maintaining an elevated temperature in each of the first chamber 511 and the second chamber 513. Additionally, one or more temperature measurement devices 543 are provided for measuring a temperature within each of the first chamber 511 and the second chamber 513. In one embodiment, the flow verifier device 300 is connected to a control system 547 that is defined to control actuation of each valve in the flow verifier device 300, control the heater 541, and provide for data acquisition from the temperature and pressure measurements devices 543, 525, and 533.

Internal to each of the first chamber 511 and the second chamber 513 is a first volume and a second volume, respectively. In one embodiment, the second volume is defined to be larger than the first volume by at least a factor of ten. For example, in one embodiment the small volume is defined as approximately one liter within the first chamber 511, and the large volume is defined as approximately 10 liters within the second chamber 513. It should be appreciated that in other embodiments the ratio of the second volume to the first volume can be less than or greater than ten. However, the ratio of the second volume to the first volume should be established such that gas flow rates can be accurately measured over an anticipated operating range of gas flow rates and within time constraints established for the gas flow rate measurements.

In one embodiment, the second pressure measurement device 533 is defined to measure a pressure at least one hundred times greater than the maximum pressure measurable by the first pressure measurement device 525. In one embodiment, the first and second pressure measurement devices 525/533 are implemented as a first and second manometer, wherein the first manometer is capable of measuring pressures up to 1 torr and the second manometer is capable of measuring pressures up to 100 torr. It should be appreciated that in other embodiments the maximum pressure measurable by the second pressure measurement device 533 can be more or less than one hundred times the maximum pressure measurable by the first pressure measurement device 525. However, the maximum measurable pressures of the first and second pressure measurement devices 525/533 should be established such that gas flow rates can be accurately measured over an anticipated operating range of gas flow rates and within time constraints established for the gas flow rate measurements.

In other embodiments, more than two bridge lines can be connected between the output line 515 of the first chamber 511 and the output line 517 of the second chamber 513, wherein each bridge line includes a respective pressure measurement device. It should be appreciated that in embodiments where multiple bridge lines are implemented, the pressure measurement devices associated with the bridge lines can be defined to provide a more refined pressure measurement capability in terms of overall pressure range and sensitivity.

In one embodiment, the first chamber 511 and the second chamber 513 are machined out of a solid aluminum block. Use of aluminum in this embodiment provides for good thermal uniformity within the chambers when heated. In this embodiment each of the first chamber and the second chamber 513 is defined to be sealed by a respective cover and o-ring. Use of removable covers allows the first and second chambers 511/513 to be more easily serviced and cleaned. Also, tubing penetrations into the first and second chambers 511/513 can be sealed through use of o-rings as opposed to welding. A leak rate introduced by the use of o-ring seals can be accounted for in the gas flow rate measurements performed using the flow verifier device 300. In alternative embodiments, the first and second chambers 511/513 can be made from materials other than aluminum, e.g., stainless steel. Additionally, in other embodiments, closure mechanisms other than o-rings can be utilized.

The two chambers 511/513 and two pressure measurement devices 525/533 provide the flow verifier device 300 with the capability to measure gas flow rates accurately and repeatably over a wide range of flow rates, e.g., 0.5 sccm to 5000 sccm, wherein sccm refers to standard cubic centimeter(s) per minute. More specifically, the flow verifier device 300 provides for selection of either the first volume, i.e., first chamber 511, the second volume, i.e., the second chamber 513, or both the first and second volumes as a test volume within which the gas flow rate measurement is to be performed. Additionally, the flow verifier device 300 provides for selection of either the first or second pressure measurement device 525/533 for use in performing the gas flow rate measurement. It should be appreciated that selection of the test volume and selection of the pressure measurement device to be used during the measurement is afforded by the various isolation valves 503, 505, 521, 523, 529, and 531 implemented within the flow verifier device 300.

In view of the configurable nature of the flow verifier device 300, accurate resolution of gas flow rate measurements is based upon an appropriate selection of test volume and pressure measurement device. Selection of the appropriate test volume and pressure measurement device for use in a given gas flow rate measurement is based on the anticipated gas flow rate to be measured and the expected rate of pressure rise in the test volume. In one embodiment, four gas flow rate ranges are defined to enable selection of the appropriate test volume and pressure measurement device: 0.5 sccm to 5 sccm, 5 sccm to 50 sccm, 50 sccm to 500 sccm, and 500 sccm to 5000 sccm. It should be appreciated that the boundary values of each of these four gas flow rate ranges are approximate to within ±10%. Additionally, when an anticipated gas flow rate to be measured falls within an overlap of any two gas flow rate ranges, either of the two overlapping gas flow rate ranges can be used to select the test volume and the pressure measurement device. Table 1 below shows the test volume and pressure measurement device to be selected based on the anticipated gas flow rate range, in accordance with one embodiment of the present invention. With respect to Table 1, the terms "small" and "large" for the test volume refer to the first chamber 511 and second chamber 513, respectively. Further with respect to Table 1, the terms "small" and "large" for the pressure measurement device refer to the first pressure measurement device 525 and second pressure measurement device 533, respectively.

TABLE 1

Selection of Test Volume and Pressure Measurement Device

| Anticipated Gas Flow Rate Range | Test Volume | Pressure Measurement Device |
|---|---|---|
| 0.5 sccm to 5 sccm | small | small |
| 5 sccm to 50 sccm | large | small |
| 50 sccm to 500 sccm | small | large |
| 500 sccm to 5000 sccm | large | large |

During the gas flow rate measurement using the flow verifier device 300, a timer and the selected pressure measurement device is used to measure the rate of pressure rise within the test volume. Additionally, the temperature within the test volume is measured. Then, using Equation 1 as presented above, the measured gas flow rate is determined. The volume to be used in Equation 1 is defined as the entire volume that is in fluid communication downstream from the output of the MFC that is being verified. Once the gas flow rate is determined using Equation 1, a corrected gas flow rate can be determined by subtracting a measured leak rate of the flow verifier device 300, if any, from the measured gas flow rate.

In one embodiment, the leak rate of the flow verifier device 300 can be determined by measuring a rate of pressure rise within an evacuated chamber due to gas leakage from the test volume of the flow verifier device 300. Then, using Equation 1 above, the measured leak rate is determined. The volume to be used in Equation 1 when determining the leak rate of the flow verifier device 300 is defined as the volume of the evacuated chamber into which gas is leaking from the test volume of the flow verifier device 300.

The gas flow rate measured by the flow verifier device 300 can be compared to the corresponding gas setpoint on a calibration curve for the MFC being tested to determine if the MFC is operating within its specified gas flow rate tolerance. If the MFC is not operating within its specified tolerance, an evaluation can be performed to determine if an appropriate equivalent flow rate adjustment factor is applicable, i.e. use of an offset factor, or if the MFC needs to be replaced.

During operation of the flow verifier device 300, the heater 541 is used to maintain an elevated, i.e., above ambient, and uniform temperature within the first and second chambers 511/513. The elevated temperature enables flow rate measurements of gases that condense at lower temperatures. Condensation of gases downstream from the MFC outlet can introduce error in the gas flow rate measurement because volume occupied by the condensed gas is not accounted for in the free volume parameter of Equation 1 above. Additionally, condensed gases can adversely affect pressure measurements performed using the pressure measurement devices 525/533. Furthermore, gas inlets into each of the first and second chambers 511/513 can be designed to slow the gas stream and provide a large surface area of contact between the gas stream and heated walls of the gas inlets. Thus, the gas inlets can be designed to pre-heat the gas prior to entering the test volume in order to avoid condensation upon venting into the test volume.

The configurable test configuration of the flow verifier device 300 provides for use of a large pressure differential during gas flow rate measurements, particular at the lower end of each gas flow rate range as identified in Table 1. The configurable test configuration of the flow verifier device 300 also minimizes an amount of time required to perform gas flow rate measurements, particularly at the higher end of each gas flow rate range as identified in Table 1. In one embodiment, the flow verifier device 300 enables accurate gas flow rate measurements to be performed for each gas flow rate range as identified in Table 1 within a time period extending from about 5 seconds to about 60 seconds, while utilizing at least 40% of the pressure range of the selected pressure measurement device.

As previously mentioned, the flow verifier device 300 can be connected to the control system 547. Using a combination of digital and analog control devices, the control system 547 functions to control operation of the flow verifier device 300 in accordance with user specified inputs. Also, the control system 547 functions to acquire data, e.g., pressure, temperature, valve states, associated with the flow verifier device 300 for analysis and presentation to a user. In one embodiment, a graphical user interface (GUI) for controlling the flow verifier device 300 is rendered on a display of a computer system associated with the tool platform 100. The GUI is defined to present a user with a number of options for configuring the flow verifier device 300. In one embodiment, the GUI can provide an option for automated configuration of the flow verifier device 300 based upon a particular gas flow rate calibration test to be performed. For example, through the user interface provided by the GUI, the user can specify that a multiple point gas calibration be performed on one or more gas sticks within the gas box of a particular process module. Additionally, the user can be provided with options for specifying a maximum and minimum flow rate to be tested for each gas stick. It should be appreciated that any other configurable parameter associated with either the flow verifier device 300 or operation thereof can be presented as a user-configurable item in the GUI.

The computer system associated with the tool platform 100 can also be used to perform the mathematical calculations associated with each gas flow rate measurement performed by the flow verifier device 300. For example, the computer system can be defined to use data acquired from the flow verifier device 300 to calculate the gas flow rate, calculate the leak rate, calculate the corrected gas flow rate, and compare the corrected gas flow rate to MFC calibration records. Furthermore, the computer system can be defined to correct gas flow rate measurements for other effects, such as non-ideal gas behavior as a function of pressure, temperature, and specific gas properties. The computer system and GUI can be used to archive gas flow rate calibration results. The archived gas flow rate calibration results can be analyzed to identify time-dependent trends or process module-dependent trends.

Figure 6:
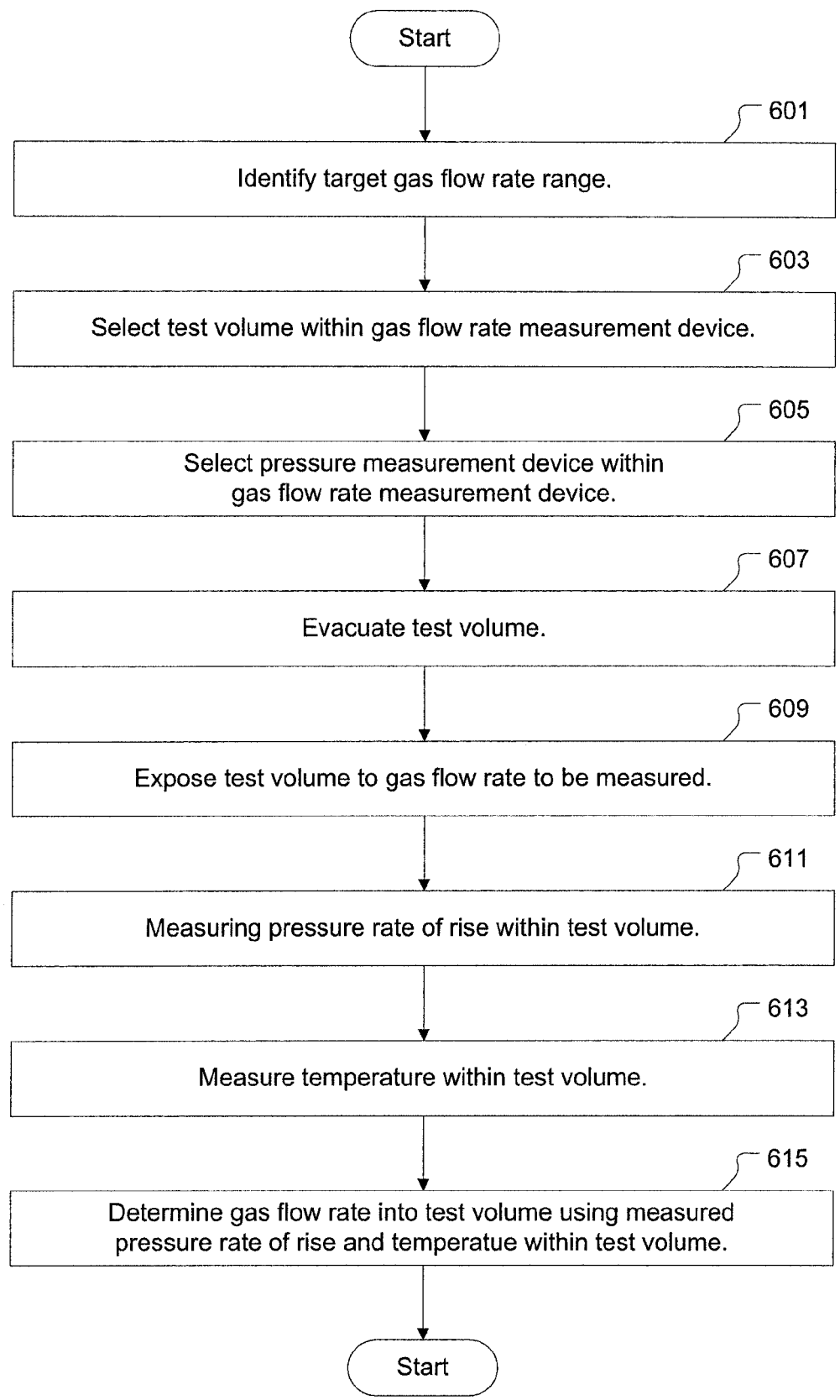
FIG. 6 is an illustration showing a flowchart of a method for operating the flow verifier device, in accordance with one embodiment of the present invention.

FIG. 6 is an illustration showing a flowchart of a method for operating the flow verifier device 300, in accordance with one embodiment of the present invention. The method includes an operation 601 for identifying a target gas flow rate range to be measured. An operation 603 is then performed to select either a small volume or a large volume for use as a test volume for measuring the gas flow rate. An operation 605 is also performed to select either a lower pressure measurement device or a higher pressure measurement device for use during the gas flow rate measurement. Selection of the test volume and pressure measurement device in operations 603 and 605 is based on the target gas flow rate range to be measured. In one embodiment, the guidelines set forth in Table 1, as previously discussed, can be used to select the test volume and pressure measurement device for use in testing.

The method further includes an operation 607 for evacuating the test volume. In a subsequent operation 609, the test volume is exposed to the gas flow rate to be measured. An operation 611 is then performed to measure a pressure rate of rise within the test volume. In one embodiment, the pressure rate of rise measurement in operation 611 is performed within a time period extending from about 5 seconds to about 60 seconds. Additionally, an operation 613 is performed to measure a temperature within the test volume. In one embodiment, the temperature within the test volume and surrounding structure is maintained to be higher than a condensation temperature of the gas to which the test volume is exposed. Upon completion of operations 611 and 613, an operation 615 is provided for determining the gas flow rate into the test volume using the measured pressure rate of rise and temperature within the test volume, as previously discussed with respect to Equation 1.

In one embodiment, the method can further include operations for isolating the test volume from the gas flow rate to be measured and measuring a gas leak rate associated with the test volume. Then, the gas flow rate determined in the operation 615 can be corrected to account for the measured gas leak rate.

Because the two flow verifier device 300 volumes (511/513) are accurately known, the flow verifier device 300 can be used to perform a calibration self-check of each pressure measurement device 525/533. For example, the larger volume 513 can be pressurized to a known pressure while the small volume 511 is evacuated. Then, the isolation between the large and small volumes can be opened such that pressure between the large and small volumes is allowed to equilibrate. In this process, the pressure measurement devices 525/533 can be used to cross-check each other to determine if they are still adequately calibrated.

Additionally, because the flow verifier device 300 volumes (511/513) are large relative to the external interconnecting tubing volume between the gas box 109a-109d and the flow verifier device 300, the flow verifier device 300 can be used to verify the external interconnecting tubing volume. For example, either or both of the flow verifier device 300 volumes (511/513) can be pressurized to a known pressure while the external volume is evacuated. Then, an isolation between the pressurized flow verifier device 300 volume and the external volume can be opened such that pressure is allowed to equilibrate. Since the pressurized flow verifier device 300 volume is known and the initial and final pressures are known, the external volume can be determined, i.e., $P_1V_1=P_2V_2$.

Use of two chamber volumes and two pressure measurement devices gives the flow verifier device 300 the ability to verify gas flow rates accurately and repeatably over a very large gas flow rate range, e.g., 0.5 sccm to 5000 sccm. The two chamber volumes of the flow verifier device 300 are established such that each gas flow rate calibration point over the entire gas flow rate range can be measured within a time period extending from about 5 seconds to about 60 seconds. Additionally, as a shared device in the tool platform 100, the flow verifier device 300 is not size sensitive. Thus, designing the flow verifier device 300 to maximize gas flow rate measurement flexibility without regard to flow verifier device 300 size restrictions allows the single flow verifier device 300 to be suitable for measuring gas flow rates over the entire gas flow rate range. Furthermore, the flow verifier device 300 is designed to be cleanable and purgeable. The cleanability of the flow verifier device 300 is particularly useful when measuring flow rates of toxic, corrosive, or condensable gases.

In addition to the aforementioned features of the flow verifier device 300, the flow verifier device 300 is also capable of measuring pressure responses to characterize MFC transient flow effects. More specifically, for a given gas flow, the pressure measurement device and test volume can be selected in a manner that provides information about transient MFC turn-on overshoots and undershoots relative to the gas flow setpoint of the MFC. Furthermore, a gas can be run through the flow verifier device 300 in purge mode while transient effects are monitored through pressure changes in a given volume. The pressure changes can be correlated to the mass flow for identifying differences in MFCs. Transient information of this type is becoming increasingly important for the latest semiconductor technology process control, which requires knowledge of both steady-state flow control and transient flow control.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A central cluster tool platform for semiconductor processing, comprising:
    a plurality of wafer processing modules accessible from a central location;
    a plurality of gas supply control systems, where each of the plurality of wafer processing modules is associated with a respective one of the plurality of gas supply control systems; and
    a gas flow rate verification device disposed in a central location relative to the plurality of wafer processing modules, the gas flow rate verification device defined to be selectively connected in fluid communication with each of the plurality of gas supply control systems, wherein the gas flow rate verification device is defined to measure a gas flow rate supplied by the gas supply control system to which the gas flow rate verification device is selectively connected.

2. The central cluster tool platform for semiconductor processing as recited in claim 1, further comprising:
    a computer system defined to manage data acquisition from the gas flow rate verification device and control the gas flow rate verification device, the computer system further defined to render a graphical user interface for monitoring and controlling the gas flow rate verification device.

3. The central cluster tool platform for semiconductor processing as recited in claim 1, wherein the gas flow rate verification device is defined to correct for a leak rate when measuring the gas flow rate.

4. The central cluster tool platform for semiconductor processing as recited in claim 1, wherein the gas flow rate verification device is defined to measure gas flow rates within a range extending from about 0.5 standard cubic centimeter per minute to about 5000 standard cubic centimeters per minute.

5. The central cluster tool platform for semiconductor processing as recited in claim 1, wherein the gas flow rate verification device is defined to include,
   a first volume defined within a first chamber,
   a second volume defined within a second chamber, the second volume being larger than the first volume,
   a first bridge line defined to connect the first volume to the second volume, the first bridge line including a first valve and a second valve,
   a first pressure measurement device disposed between the first valve and the second value,
   a second bridge line defined to connect the first volume to the second volume, the second bridge line including a third valve and a fourth valve, and
   a second pressure measurement device disposed between the third valve and the fourth value, the second pressure measurement device capable of measuring higher pressures than the first pressure measurement device,
   wherein either the first volume, the second volume, or both the first and second volumes is selectable as a test volume for measuring a gas flow rate,
   wherein either the first pressure measurement device or the second pressure measurement device is selectable for measuring a pressure within the test volume.

6. The central cluster tool platform for semiconductor processing as recited in claim 5, wherein the second volume is at least ten times larger than the first volume.

7. The central cluster tool platform for semiconductor processing as recited in claim 5, wherein the second pressure measurement device is capable of measuring pressures at least one hundred times larger than the first pressure measurement device.

* * * * *